(12) United States Patent
Shimano et al.

(10) Patent No.: US 9,000,093 B2
(45) Date of Patent: Apr. 7, 2015

(54) METHOD FOR PRODUCING RESIN COMPOSITION AND MOLDED ARTICLE

(75) Inventors: Mitsuyoshi Shimano, Kimitsu (JP); Satoru Moritomi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 742 days.

(21) Appl. No.: 12/745,986

(22) PCT Filed: Dec. 8, 2008

(86) PCT No.: PCT/JP2008/072720
§ 371 (c)(1),
(2), (4) Date: Jun. 3, 2010

(87) PCT Pub. No.: WO2009/072677
PCT Pub. Date: Jun. 11, 2009

(65) Prior Publication Data
US 2010/0261846 A1    Oct. 14, 2010

(30) Foreign Application Priority Data

Dec. 7, 2007  (JP) .................. 2007-316775

(51) Int. Cl.
| C08L 63/00 | (2006.01) |
| C08L 23/00 | (2006.01) |
| C08L 33/02 | (2006.01) |
| C08L 23/06 | (2006.01) |
| C08J 3/20  | (2006.01) |
| C08L 23/10 | (2006.01) |
| C08J 3/00  | (2006.01) |
| C08L 23/16 | (2006.01) |
| C08L 23/08 | (2006.01) |
| C08L 67/04 | (2006.01) |

(52) U.S. Cl.
CPC .................. C08J 3/201 (2013.01); C08L 23/16 (2013.01); C08L 23/10 (2013.01); C08J 2367/04 (2013.01); C08L 23/0815 (2013.01); C08J 3/005 (2013.01); C08L 2205/035 (2013.01); C08L 23/0884 (2013.01); C08J 2300/16 (2013.01); C08L 67/04 (2013.01)

(58) Field of Classification Search
USPC .................................... 525/190, 55, 221, 240
See application file for complete search history.

(56) References Cited

U.S. PATENT DOCUMENTS

| 2008/0036119 A1 | 2/2008 | Kanazawa |
| 2010/0160505 A1 | 6/2010 | Kumazawa et al. |

FOREIGN PATENT DOCUMENTS

| EP | 1679347 A1 * | 7/2006 |
| JP | 2006-077063 A | 3/2006 |
| JP | 2006-176711 A | 7/2006 |
| JP | 2007-277444 A | 10/2007 |
| JP | 2007-302748 A | 11/2007 |
| JP | 2007-308638 A | 11/2007 |
| JP | 2007308638 A * | 11/2007 |
| JP | 2007-326961 A | 12/2007 |
| JP | 2008-069342 A | 3/2008 |
| WO | 2005/035656 A1 | 4/2005 |
| WO | 2007/015448 A1 | 2/2007 |

* cited by examiner

*Primary Examiner* — Kelechi Egwim
(74) *Attorney, Agent, or Firm* — Sughrue Mion, PLLC

(57) ABSTRACT

There is provided a method for producing a resin composition which is good in dispersability of a biodegradable resin. This method has a first kneading step of kneading (A) a biodegradable resin and (B) a compound that is reactive with the biodegradable resin (A) to produce a resin composition precursor, and a second kneading step of kneading the resin composition precursor and a polyolefin resin (C).

7 Claims, 1 Drawing Sheet

200,000 B2

METHOD FOR PRODUCING RESIN COMPOSITION AND MOLDED ARTICLE

TECHNICAL FIELD

The present invention relates to a method for producing a resin composition, and a molded article that is obtained from the resin composition. Specifically, it relates to a method for producing a resin composition which contains a biodegradable resin and is excellent in impact resistance, and a molded article which is obtained from this resin composition.

BACKGROUND ART

In recent years, because of a problem of exhaustion of petroleum resources, a global warming problem caused by discharge of carbon dioxide gas, etc., resins produced from plant-derived raw materials, such as polylactic acid and polybutylene succinate, are attracting attention as a carbon-neutral material. However, since the mechanical strength of a plant-derived resin is low, its use in combination with a polyolefin resin is being studied.

For example, JP 2006-077063 A discloses a resin composition containing a polyolefin resin, an aliphatic polyester-based biodegradable polymer, and an acid- or epoxy group-containing polyolefin. In JP 2006-077063 A, it is disclosed that it becomes possible to provide a composition and a molded article excellent in balance of physical properties, such as workability, impact resistance, and elastic modulus, by using an acid- or epoxy group-containing polyolefin.

However, the resin composition disclosed in JP 2006-077063 A is not sufficient in dispersibility of a biodegradable resin, and when a molded article is produced therefrom, the mechanical strength of the resulting molded article may not reach a desired level.

DISCLOSURE OF THE INVENTION

In view of the problems with the above-mentioned conventional technologies, an object of the present invention is to provide a method which can provide a resin composition which is good in dispersibility of a biodegradable resin. The present inventors found that the dispersibility of a biodegradable resin could be improved by kneading a biodegradable resin and a polyolefin resin by a certain method and thus they have accomplished the present invention.

The present invention relates to a method for producing a resin composition containing (A) a biodegradable resin and (C) a polyolefin resin, wherein the method includes: a first kneading step of kneading the biodegradable resin (A) and (B) a compound that is reactive with the biodegradable resin (A) to produce a resin composition precursor, and a second kneading step of kneading the resin composition precursor and the polyolefin resin (C).

Figure 1:
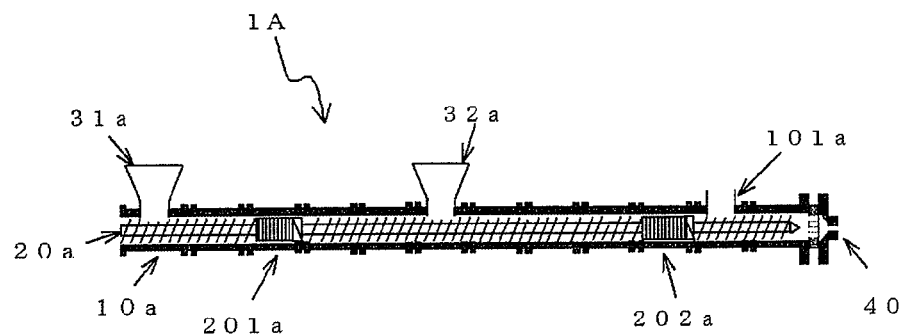
FIG. 1 is a diagram illustrating a first example of a kneading machine preferably used in the present invention.

The meanings of the symbols in the drawings are as follows. 1A, 1B, 1C kneading machine; 10a, 10b, 10c cylinder; 101a, 101b, 101c vacuum vent; 20a, 20b, 20c screw; 201a, 201b, 201c first kneading section; 202a, 202b second kneading section; 203b third kneading section; 31a, 31b upstream feeding port; 31c feeding port; 32a, 32b downstream feeding port; 33 feeding port for elastomer; 40 resin outlet.

MODE FOR CARRYING OUT THE INVENTION

Method for Producing a Resin Composition

[First Kneading Step]

The method for producing a resin composition according to the present invention has a first kneading step and a second kneading step.

In the "first kneading step", (A) a biodegradable resin (henceforth, referred to also as component (A)) and (B) a compound that is reactive with the biodegradable resin (A) (henceforth, referred to also as component (B)) are kneaded, so that a resin composition precursor is produced. By producing a resin composition precursor by kneading a biodegradable resin and a compound that is reactive with this biodegradable resin, it becomes possible to increase the compatibility of a biodegradable resin and a polyolefin resin.

<Component (A)>

The biodegradable resin (A) to be used in the first kneading step is a resin which has a biodegradability measured in accordance with the method provided in JIS K6953 of 60% or more during a time period prescribed in the aforesaid testing method (i.e., 180 days). The biodegradable resin (A) is generally a resin produced from a plant-derived raw material. Examples of the resin produced from a plant-derived raw material include polylactic acid, polybutylene succinate, polyethylene succinate, poly(butylene succinate/adipate), polycaprolactone, poly(butylene succinate-($\delta$-oxycaproate)), and poly-3-hydroxybutyrate. Moreover, this component (A) may be a copolymer of a biodegradable resin with a polyolefin resin or a grafted polymer of a biodegradable resin with a polyolefin resin.

Among these, it is preferable to use polylactic acid, which has characteristics such as being high in rigidity, being high in reactivity because it has a carboxyl group at its molecular terminal, and being easy to obtain. As to the biodegradable resin (A), it is permitted to use this type of resin(s) singly or in combination.

The polylactic acid as the biodegradable resin (A) is preferably one in which the ratio of the L-form in the lactic acid components forming the polylactic acid is 94 mol % or more. By bringing the ratio of the L-form into such a range, it becomes possible to prevent the melting point from lowering. Moreover, the biodegradable resin (A) may also be a copolymer of a polylactic acid and another biodegradable resin. Examples of another biodegradable resin include polybutylene succinate, polyethylene succinate, poly(butylene succinate/adipate), polycaprolactone, poly(butylene succinate-($\delta$-oxycaproate)), and poly-3-hydroxybutyrate.

The weight average molecular weight of the biodegradable resin (A) is preferably from 10,000 to 500,000, and more preferably from 50,000 to 400,000. It is even more preferably from 70,000 to 300,000. When the weight average molecular weight is 10,000 or more, it is possible to obtain a molded article excellent in impact strength. Moreover, when the weight average molecular weight is 500,000 or less, the dispersibility of the biodegradable resin (A) is good.

It is preferable for the polylactic acid as the biodegradable resin (A) to have a molecular weight of 60,000 or more.

The synthesis method of the biodegradable resin (A) is not restricted. Examples of the synthesis method of the polylactic acid include a direct polycondensation method from lactic acid and a ring opening polymerization method via a lactide.

Polyethylene succinate and polybutylene succinate can be produced, for example, by the method disclosed in JP 6-271656 A. By this method, succinic acid (or its anhydride) and ethylene glycol (or 1,4-butanediol) are subjected to transesterification to obtain an oligomer and then the obtained oligomer is polycondensed.

Moreover, as disclosed in JP 4-189822 A and JP 5-287068 A, it is also permitted to use a diisocyanate or tetracarboxylic dianhydride as a crosslinking agent in the production of polyethylene succinate and polybutylene succinate.

A polycaprolactone is obtained by reacting ε-caprolactone and a diol, such as ethylene glycol and diethylene glycol, in the presence of a catalyst. Examples of the catalyst to be used in this reaction include organotin compounds, organotitanium compounds, and organic halogenated tin compounds. A polycaprolactone can be obtained by adding such a catalyst in an amount of 0.1 ppm to 5000 ppm and polymerizing monomers at 100° C. to 230° C. preferably in an inert gas. These production methods are disclosed in JP 35-189 B, JP 35-497 B, JP 40-23917 B, JP 40-26557 B, JP 43-2473 B, JP 47-14739 B, JP 56-49720 A, and JP 58-61119 A.

<Component (B)>

In the present invention, (B) a compound that is reactive with the above-described biodegradable resin (A) is used. Examples of the component (B) include one or more compounds selected from polymers of a compound containing an epoxy group and polymers of a compound containing an unsaturated carboxylic acid.

Examples of the polymer of a compound containing an epoxy group to be used as the component (B) include copolymers having monomer units derived from ethylene and monomer units derived from a monomer having an epoxy group. Examples of the monomer having an epoxy group include α,β-unsaturated glycidyl esters, such as glycidyl methacrylate and glycidyl acrylate, and α,β-unsaturated glycidyl ethers, such as allyl glycidyl ether and 2-methylallyl glycidyl ether; glycidyl methacrylate is preferred. Such copolymers specifically include glycidyl methacrylate-ethylene copolymers (e.g., one available from Sumitomo Chemical Co., Ltd., under a commercial name "Bondfast").

Examples of the compound having an epoxy group include glycidyl methacrylate-styrene copolymers, glycidyl methacrylate-acrylonitrile-styrene copolymers, and glycidyl methacrylate-propylene copolymers.

It is possible to use a grafted polymer obtained by graft-polymerizing by solution- or melt-kneading a monomer having an epoxy group to a polyethylene, a polypropylene, a polystyrene, an ethylene-α-olefin copolymer, a hydrogenated or non-hydrogenated styrene-conjugated diene, or the like. In comparison of such grafted polymers to the aforementioned compound containing an epoxy group, the use of the compound containing an epoxy group is preferable because it can render the added amount of a monomer having an epoxy group larger.

The polymer of a compound containing an epoxy group to be used as the component (B) may have monomer units derived from monomers other than the compound containing an epoxy group. Examples of such a monomer include unsaturated carboxylic acid esters, such as methyl acrylate, ethyl acrylate, methyl methacrylate, and butyl acrylate, and unsaturated vinyl esters, such as vinyl acetate and vinyl propionate.

In the polymer of a compound containing an epoxy group, the content of the monomer units derived from monomers having an epoxy group is 0.01% by mass to 30% by mass, and preferably 0.1% by mass to 20% by mass, where the content of all monomer units in the ethylene-based polymer having an epoxy group is 100% by mass. The content of the monomer units derived from the monomers having an epoxy group is measured by an infrared method.

The melt flow rate of the polymer of a compound having an epoxy group is 0.1 g/10 minutes to 300 g/10 minutes, and preferably 0.5 g/10 minutes to 80 g/10 minutes. The melt flow rate as referred to herein is measured under conditions including a test load of 21.18 N and a test temperature of 190° C. in accordance with the method provided in JIS K 7210 (1995).

The polymer of a compound having an epoxy group can be produced by, for example, a method of copolymerizing a monomer having an epoxy group, ethylene, and, according to necessity, other monomers by high-pressure polymerization, solution polymerization, emulsion polymerization, or the like or a method of graft-polymerizing a monomer having an epoxy group to an ethylene-based resin.

Examples of the polymer of a compound having an unsaturated carboxylic acid include an ethylene-α,β-unsaturated carboxylic acid alkyl ester-maleic anhydride terpolymer (trade name "BONDINE" produced by Sumitomo Chemical Co., Ltd.).

The ethylene-α,β-unsaturated carboxylic acid alkyl ester-maleic anhydride terpolymer is a copolymer produced by high-pressure radical copolymerization. The α,β-unsaturated carboxylic acid alkyl ester includes alkyl esters of unsaturated carboxylic acids having 3 to 8 carbon atoms, such as acrylic acid and methacrylic acid, and specific examples thereof include methyl acrylate, ethyl acrylate, n-propyl acrylate, isopropyl acrylate, n-butyl acrylate, tert-butyl acrylate, isobutyl acrylate, methyl methacrylate, ethyl methacrylate, n-propyl methacrylate, isopropyl methacrylate, n-butyl methacrylate, tert-butyl methacrylate, and isobutyl methacrylate. Among these, methyl acrylate, ethyl acrylate, n-butyl acrylate, and methyl methacrylate are particularly preferable. These comonomers may be used singly or two or more of them may be used in combination.

In comparison of a polymer of a compound having an epoxy group with a polymer of a compound having an unsaturated carboxylic acid, the use of the polymer of a compound having an epoxy group is preferable from the viewpoint of the reactivity with a biodegradable resin.

As the polymer of a compound having an unsaturated carboxylic acid, it is possible to use a material obtained by graft-polymerizing by solution- or melt-kneading an unsaturated carboxylic acid with a polyethylene, a polypropylene, a polystyrene, an ethylene-α-olefin copolymer, a hydrogenated or non-hydrogenated styrene-conjugated diene-based block elastomer, or the like. In comparison of this grafted copolymer to the above-mentioned copolymer, it is preferable to use the copolymer because it can increase the added amount of the unsaturated carboxylic acid.

Moreover, the component (B) has a biodegradability measured in accordance with the method provided in JIS K6953 of less than 60% during a time period prescribed in the aforesaid testing method (i.e., 180 days).

In the first kneading step, a compound compatible with the biodegradable resin (A) may also be added together with the component (B). As such a compound, it is permitted to use at least one compound selected from oxymethylene, lactide, hydroxyalkanoate, and starch.

In the "first kneading step", a resin composition precursor is produced by kneading the component (A) and the component (B).

The kneading temperature of the first kneading step is not lower than the melting point temperature of the component (A) or the component (B), whichever is higher in melting point, and is from (the melting point+10° C.) to (the melting point temperature+150° C.), and preferably is from (the melting point+40° C.) to (the melting point+100° C.). By determining the kneading temperature of the first kneading step within such a temperature range, it becomes possible to make compatibilization or reaction of the component (A) with the component (B) proceed sufficiently. For example, when a polylactic acid-based resin is used as the component (A), a polymer of a compound having an epoxy group is used as the component (B), and a polypropylene resin is used as the component (C), the kneading temperature of the first kneading step is preferably 200° C. or higher, more preferably 230° C. or higher, and even more preferably 235° C. or higher. The kneading temperature can be measured by bringing a thermocouple into contact with a resin composition precursor in a molten state which has just been extruded through a resin outlet provided to the cylinder of a kneading machine.

The kneading time of the first kneading step, which may be determined appropriately so that neither the component (A) nor the component (B) may thermally decompose and the reaction of the components may proceed better, is 1 second to 1800 seconds, preferably 2 seconds to 600 seconds, and more preferably 3 seconds to 300 seconds. By determining the kneading time to be 1 second or more, it becomes possible to perform the compatibilization or the reaction of the component (A) and the component (B) sufficiently. As a result, the dispersed particle diameter of the component (A) in a molded article obtained becomes larger and it becomes possible to prevent the mechanical strength from lowering. By determining the kneading time to be 1800 seconds or less, it becomes possible to prevent the components from thermally decomposing. As a result of this, it becomes possible to prevent a molded article to be obtained from deteriorating in mechanical strength or deteriorating in appearance.

The kneading time is a time during which a molten resin is kneaded when using a batch type kneading machine or it is a peak time of a residence time distribution when using a continuous type kneading machine. An example of the method for obtaining the peak time is a method in which a pigment is charged simultaneously with the components (A) and (B) into a continuous kneading machine through a hopper, a molten resin extruded through the outlet of the kneading machine is sampled at a fixed time interval, and a time at which the degree of coloring is the highest is determined.

[Second Kneading Step]

In the "second kneading step", a resin composition is produced by kneading the resin composition precursor obtained by the first kneading step with (C) a polyolefin resin.

<Component (C)>

Examples of the polyolefin resin (C) include homopolymers of olefins and copolymers of two or more olefins. Specific examples include a polyethylene resin, a polypropylene resin, and a polybutene resin. Among these, a polypropylene resin is preferred. Such polyolefin resins (C) each may be used singly or two or more of them may be used in combination.

Examples of the polyethylene resin include ethylene homopolymers, and ethylene-α-olefin copolymers. Examples of α-olefin to be used for ethylene-α-olefin copolymers include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. Especially, 1-butene, 1-pentene, 1-hexene, and 1-octene are preferable.

Examples of the polypropylene resin include propylene homopolymers, propylene-ethylene random copolymers, propylene-α-olefin random copolymers, propylene-ethylene-α-olefin copolymers, and polypropylene-based copolymers composed of a propylene homopolymer component or a copolymer component composed mainly of propylene (henceforth, referred to also as polymer component (I)) and a copolymer component composed of propylene and ethylene and/or α-olefin (henceforth, referred to also as copolymer component (II)). Such polypropylene resins each may be used singly or two or more of them may be used in combination.

Examples of the α-olefin for constituting a polypropylene resin include α-olefins having 4 to 12 carbon atoms, examples of which include 1-butene, 1-pentene, 1-hexene, 4-methyl-1-pentene, 1-octene, and 1-decene. Among these, 1-butene, 1-hexene, and 1-octene are preferable.

Examples of the propylene-α-olefin random copolymers include propylene-1-butene random copolymers, propylene-1-hexene random copolymers and propylene-1-octene random copolymers. Examples of the propylene-ethylene-α-olefin copolymer include propylene-ethylene-1-butene copolymers, propylene-ethylene-1-hexene copolymers, and propylene-ethylene-1-octene copolymers.

Examples of the copolymer component composed mainly of propylene in the polymer component (I) of the polypropylene-based copolymer composed of the polymer component (I) and the copolymer component (II) include propylene-ethylene copolymer components, propylene-1-butene copolymer components, and propylene-1-hexene copolymer components. Examples of the copolymer component of propylene and ethylene and/or α-olefin (the aforementioned copolymer component (II)) include a propylene-ethylene copolymer component, a propylene-ethylene-1-butene copolymer component, a propylene-ethylene-1-hexene copolymer component, a propylene-ethylene-1-octene copolymer component, a propylene-1-butene copolymer component, a propylene-1-hexene copolymer component, and a propylene-1-octene copolymer component. The content of ethylene and/or α-olefin in the copolymer component (II) is preferably 10% by mass to 70% by mass.

Examples of the polypropylene-based copolymer composed of the polymer component (I) and the copolymer component (II) include a (propylene)-(propylene-ethylene) copolymer, a (propylene)-(propylene-ethylene-1-butene) copolymer, a (propylene)-(propylene-ethylene-1-hexene) copolymer, a (propylene)-(propylene-1-butene) copolymer, a (propylene)-(propylene-1-hexene) copolymer, a (propylene-ethylene)-(propylene-ethylene) copolymer, a (propylene-ethylene)-(propylene-ethylene-1-butene) copolymer, (propylene-ethylene)-(propylene-ethylene-1-hexene) copolymer, a (propylene-ethylene)-(propylene-1-butene) copolymer, a (propylene-ethylene)-(propylene-1-hexene) copolymer, a (propylene-1-butene)-(propylene-ethylene) copolymer, a (propylene-1-butene)-(propylene-ethylene-1-butene) copolymer, a (propylene-1-butene)-(propylene-ethylene-1-hexene) copolymer, a (propylene-1-butene)-(propylene-1-butene) copolymer, and a (propylene-1-butene)-(propylene-1-hexene) copolymer.

The polypropylene resin to be used as the polyolefin resin (C) is preferably a propylene homopolymer, a propylene-ethylene random copolymer, a propylene-1-butene random copolymer, a propylene-ethylene-1-butene copolymer, or a (propylene)-(propylene-ethylene) copolymer.

The production method of the polyolefin resin (C) may be a production method using a conventionally known polymerization catalyst and a conventionally known polymerization method. Examples of the polymerization catalyst include Ziegler type catalysts and Ziegler-Natta type catalysts. Additional examples include catalyst systems composed of an alkyl aluminoxane and a compound having a cyclopentadienyl ring of a transition metal of Group 4 of the periodic table, or catalyst systems composed of an organoaluminum compound, a compound having a cyclopentadienyl ring of a transition metal of Group 4 of the periodic table, and a compound capable of reacting with the transition metal compound to form an ionic complex, or catalyst systems obtained by making such catalyst systems supported on inorganic particles or the like. Moreover, the component (C) has a biodegradability measured in accordance with the method provided in JIS K6953 of less than 60% during a time period prescribed in the aforesaid testing method (i.e., 180 days).

Examples of the polymerization method include slurry polymerization or solvent polymerization using an inert hydrocarbon solvent, liquid phase polymerization or vapor phase polymerization using no solvent, or vapor phase-vapor phase polymerization or liquid phase-vapor phase polymerization in which these are performed successively. These polymerization methods may be of either a batch system or a continuous system. The method may be either a method by which the polyolefin resin (C) is produced in a single stage or a method by which the polyolefin resin is produced in two or more stages.

Particularly, the production method of a polypropylene-based copolymer composed of the aforementioned polymer component (I) and the aforementioned copolymer component (II) is preferably a multistage production method having at least two-stage steps including a stage of producing the polymer component (I) and a stage of producing the copolymer component (II).

The melt flow rate (henceforth, referred to also as MFR) of the polyolefin resin (C) is preferably 0.01 g/10 minutes to 400 g/10 minutes. When the MFR exceeds 400 g/10 minutes, the mechanical strength tends to lower. From the viewpoint of mechanical strength or production stability, the MFR is preferably 1 g/10 minutes to 400 g/10 minutes, more preferably 5 g/10 minutes to 200 g/10 minutes, and even more preferably 10 g/10 minutes to 150 g/10 minutes. The MFR referred to in the present invention is a value measured at 230° C. and a load of 21.2 N in the case of a polypropylene or a value measured at 190° C. and a load of 21.2 N in the case of a polyethylene in accordance with ASTM D1238.

<Component (D)>

In order to reduce the dispersed particle diameter of the component (A) so as to increase the impact resistance of a molded article to be obtained, and also in order to further increase the compatibility with the polyolefin resin (C), it is also permitted to further add (D) an elastomer (henceforth, referred to also as component (D)) during the first kneading step or between the first kneading step and the second kneading step. In another adoptable embodiment, part of the whole amount of the component (D) is added during the first kneading step, and the remainder of the component (D) is added between the first kneading step and the second kneading step.

As the elastomer (D), a copolymer other than the component (C) is used. Examples thereof include natural rubber, polybutadiene rubber, polyisoprene rubber, butyl rubber, amorphous or low-crystalline ethylene-based elastomer, butadiene-styrene elastomer, butadiene-acrylonitrile elastomer, hydrogenated or non-hydrogenated styrene-conjugated diene-based block elastomers, polyester rubber, acrylic rubber, and silicone rubber. The elastomer is preferably an amorphous or low-crystalline ethylene-based elastomer.

The ethylene-based elastomer is an elastomer that contains a monomer unit derived from ethylene as a main component and examples thereof include ethylene homopolymers, ethylene-α-olefin copolymers, and ethylene-ethylene-based unsaturated ester copolymers.

Preferable ethylene-based copolymers are ethylene-α-olefin copolymers, which are copolymers of ethylene and one or more α-olefins. Preferable α-olefins are α-olefins having 3 to 12 carbon atoms. Specific examples include propylene, 1-butene, 1-pentene, 1-hexene, 1-heptene, 1-octene, 1-nonene, 1-decene, 1-dodecene, 4-methyl-1-pentene, 4-methyl-1-hexene, vinylcyclohexane, vinylcyclohexene, styrene, norbornene, butadiene, and isoprene.

Examples of the hydrogenated or non-hydrogenated styrene-conjugated diene-based block elastomer include styrene-isoprene copolymers, styrene-isoprene-styrene copolymers, styrene-ethylene-butene-styrene copolymers, styrene-butadiene copolymers, and styrene-butadiene-styrene copolymers.

From the viewpoint of the mechanical strength of a molded article to be obtained, the density of the ethylene-based elastomer is preferably 850 kg/m$^3$ to 910 kg/m$^3$. It is more preferably 855 kg/m$^3$ to 900 kg/m$^3$. For example, the density of an ethylene-α-olefin copolymer is preferably 850 kg/m$^3$ or more and, from the viewpoint of the tensile elongation at break of a resin composition to be obtained, it is preferably 910 kg/m$^3$ or less. It is more preferably 855 kg/m$^3$ to 900 kg/m$^3$. The density as referred to herein is measured by the method provided in JIS K6760-1981 without annealing.

From the viewpoint of the mechanical strength of a molded article to be obtained, the MFR of the ethylene-based elastomer is preferably 0.1 g/10 minutes to 100 g/10 minutes. It is more preferably 0.3 g/10 minutes to 50 g/10 minutes, and even more preferably 0.5 g/10 minutes to 40 g/10 minutes. For example, the MFR of the ethylene-α-olefin copolymer is preferably 0.1 g/10 minutes or more and, from the viewpoint of increasing the mechanical strength of a molded article to be obtained, it is 100 g/10 minutes or less. It is more preferably 0.3 g/10 minutes to 50 g/10 minutes, and even more preferably 0.5 g/10 minutes to 40 g/10 minutes. The MFR as referred to herein is measured under conditions including a test load of 21.18 N and a test temperature of 190° C. in accordance with the method prescribed in JIS K 7210 (1995).

From the viewpoint of the mechanical strength of a molded article to be obtained, the molecular weight distribution (weight average molecular weight (Mw)/number average molecular weight (Mn)) of the ethylene-based elastomer is preferably 1.8 to 3.5, more preferably 1.8 to 2.5, and most preferably 1.8 to 2.2. For example, the molecular weight distribution of an ethylene-α-olefin copolymer is preferably 1.8 to 3.5, more preferably 1.8 to 2.5, and most preferably 1.8 to 2.2. Moreover, the component (D) has a biodegradability measured in accordance with the method provided in JIS K6953 of less than 60% during a time period prescribed in the aforesaid testing method (i.e., 180 days).

From the viewpoint of the mechanical strength of a molded article to be obtained, the melting temperature of the ethylene-based elastomer is preferably 110° C. or lower, and more preferably 100° C. or lower. From the viewpoint of the tensile elongation at break of a resin composition to be obtained, the amount of the heat of fusion of an ethylene-based elastomer is preferably 110 J/g or less, and more preferably 100 J/g or less. For example, the melting temperature of an ethylene-α-olefin copolymer is 110° C. or less, and more preferably 100° C. or less. The amount of the heat of fusion of an ethylene-α-olefin copolymer is preferably 110 J/g or less, and more preferably 100 J/g or less.

As to the production method of the ethylene-based elastomer, a conventional polymerization method using a conventional catalyst for olefin polymerization is used. For example, the ethylene-α-olefin copolymer is preferably produced by solution polymerization, slurry polymerization, high-pressure ion polymerization, or vapor phase polymerization using a Ziegler-Natta type catalyst or a complex-based catalyst, such as a metallocene complex and a non-metallocene complex, or bulk polymerization or solution polymerization using a radical initiator. Particularly, it is preferable to use a method of conducting polymerization using a Ziegler-Natta type catalyst or a complex-based catalyst, and it is preferable to use a method of conducting polymerization in the presence of a metallocene catalyst.

The kneading temperature of the second kneading step is not lower than the melting point of the component having the highest melting point among the components (A), (B), and (C), and is from (the melting point+10° C.) to (the melting point temperature+150° C.), and it is preferably from (the melting point+40° C.) to (the melting point+100° C.). By bringing the kneading temperature of the second kneading step into such a temperature range, it is possible to uniformly disperse the component (A) and the component (B) in the component (C) sufficiently and it is also possible to make the reaction of the component (A) and the component (B) proceed. For example, when a polylactic acid-based resin is used as the component (A), a polymer of a compound having an epoxy group is used as the component (B), and a polypropylene resin is used as the component (C), the kneading temperature of the second kneading step is preferably 200° C. or higher, more preferably 230° C. or higher, and even more preferably 235° C. or higher.

The kneading time of the second kneading step, which may be determined appropriately so that neither the component (A) nor the component (C) may thermally decompose and the component (A) may fully disperse in the component (C), is 1 second to 1800 seconds, preferably 2 seconds to 600 seconds, and more preferably 3 seconds to 300 seconds. By determining the kneading time to be 1 second or more, it becomes possible to perform the compatibilization or the reaction sufficiently. As a result, the dispersed particle diameter of the component (A) becomes larger and it becomes possible to prevent mechanical strength from lowering. By determining the kneading time to be 1800 seconds or less, it becomes possible to prevent the components from thermally decomposing. As a result of this, it becomes possible to prevent a molded article obtained from lowering in the mechanical strength or deteriorating in appearance. The kneading time can be measured in the same procedures as in the first kneading step.

Generally, commercially available kneading facilities can be used as the kneading facilities for the first kneading step and the second kneading step. Examples of the kneading facilities include a batch type kneading facility and a continuous type kneading facility. One examples of the batch type kneading facility is a Banbury mixer and examples of the continuous type kneading facility include a single screw kneading machine and a twin screw kneading machine. Moreover, a processing machine (e.g., an injection molding machine, a T-shaped die extruder, a blow molding machine, and a film forming machine) also can be used as the second kneading step.

As to the added amounts of the components (A), (B), (C), and (D) in the method for producing a resin composition according to the present invention, the added amount of the component (A) is 1 to 70% by mass, preferably 10% by mass to 55% by mass, and more preferably 20% by mass to 45% by mass; the added amount of the component (B) is 1 to 30% by mass, preferably 2% by mass to 20% by mass, and more preferably 3% by mass to 10% by mass; and the added amount of the component (C) is 30 to 98% by mass, preferably 40% by mass to 90% by mass, and more preferably 50% by mass to 80% by mass, where the combined amount of the components (A), (B), and (C) is 100% by mass. The amount of the component (D) is 0.1 to 50% by mass, and preferably 1 to 30% by mass, where the combined amount of the components (A), (B), (C), and (D) is 100% by mass.

If the added amount of the component (A) is excessively large, there is a tendency that the dispersed particle diameter becomes large, so that the impact resistance will deteriorate. If the amount of the component (B) is excessively small, there is a tendency that the dispersed particle diameter of the component (A) becomes large, so that the impact resistance may deteriorate; if it is excessively large, there is a tendency that gels are formed in the surface of a molded article, so that the appearance of the molded article will deteriorate. If the amount of the component (C) is excessively small, defects of appearance, such as flow marks, tend to occur as a result of decease of impact strength or deterioration of moldability.

In the present invention, besides the aforementioned components, other additional components may be added as long as the characteristics and effects of the present invention are not impaired. Examples of such components include antioxidants, weather resistance improving agents, nucleating agents, flame retardants, plasticizers, lubricants, antistatic agents, colorants, fillers (talc, mica, calcium carbonate, glass fiber, carbon fiber, wollastonite, and magnesium sulfate whisker), and the like.

[Production Method of Resin Composition Using Kneading Machine]

The production of a resin composition according to the present invention is performed by using a kneading machine. In the following, a detailed explanation is made with reference to drawings. In the drawings, symbols with the same numeral indicate the same or substantially the same constituting elements.

FIG. 1 is a diagram that illustrates a kneading machine for producing a resin composition according to the present invention. A kneading machine 1A is constituted of a cylinder 10a and a screw 20a. The cylinder 10a is equipped with an upstream feeding port 31a, a downstream feeding port 32a, and a vacuum vent 101a in the order viewed from the upstream side to the downstream side (from the left side to the right side facing the drawing), and a resin outlet 40 is provided at one end of the vacuum vent 101a.

On the other hand, the screw 20a has a first kneading section 201a and a second kneading section 202a. The first kneading section 201a is provided so that it may be located between the upstream feeding port 31a and the downstream feeding port 32a, and the second kneading part 202a is provided so that it may be located between the downstream feeding port 32a and the vacuum vent 101a. In the kneading sections, a forward flight, a reverse flight, an R kneading disk, an N kneading disk, an L kneading disk, a rotor, and so on are used in combination. The cylinder 10a can be heated with an external heater (not shown). The screw 20a, excluding its kneading sections, is mainly constituted of a forward flight provided with a spiral groove and can be driven by an external motor (not shown).

Respective components charged through the upstream feeding port 31a and/or the downstream feeding port 32a are heated to melt within the cylinder 10a. The respective molten components are transferred toward the resin outlet 40 by the action of the spiral groove cut on the screw 20a and the rotation of the screw 20a. The pressure in the vacuum vent 101a is reduced by a water seal type vacuum pump, or the like, and the vacuum vent removes decomposed components and volatile components which generate at the time of kneading.

In the production method of a resin composition according to the present invention, a component (A) and a component (B) are fed to the upstream feeding port 31a and kneaded first, so that a resin composition precursor is obtained (a first kneading step). After the execution of kneading under prescribed conditions, a component (C) is fed to the downstream feeding port 32a and is combined and kneaded with the resin composition precursor produced in the first kneading step. The component (C) may also be fed through the upstream feeding port 31a in such an amount that the mechanical strength does not deteriorate.

The cylinder temperature of the first kneading step is preferably 50° C. to 300° C., and more preferably 100° C. to 250° C. By determining the cylinder temperature to 50° C. or higher, it becomes possible to perform the compatibilization or the reaction of the component (A) and the component (B) sufficiently. As a result, it becomes possible to increase the impact resistance of a molded article to be obtained. By determining the cylinder temperature to 300° C. or lower, it becomes possible to prevent the component (A) and the component (B) from thermally deteriorating.

The kneading time of the first kneading step is preferably from 1 second to 1800 seconds, more preferably from 2 seconds to 600 seconds, and even more preferably from 3 seconds to 300 seconds.

The cylinder temperature of the second kneading step is preferably 50° C. to 300° C., and more preferably 100° C. to 250° C. By using such a preset temperature, it is possible to render the dispersed particle diameter of the component (A) dispersed in the component (C) smaller, and it becomes possible to prevent respective components from thermally deteriorating.

The kneading time of the second kneading step is preferably from 1 second to 1800 seconds, more preferably from 2 seconds to 600 seconds, and even more preferably from 3 seconds to 300 seconds.

In the first kneading step, it is also permitted to add a component (D) and a small amount of the component (C) so that the dispersed particle diameter of the component (A) may not become 1 μm or more. Examples of the addition method of the elastomer (D) include method (1): a method in which the elastomer (D) is fed together with the component (A) and the component (B) through the upstream feeding port 31a and kneaded, and method (2): a method in which the component (A) and the component (B) are kneaded to produce a resin composition precursor and then the elastomer (D) is fed through the upstream feeding port 31a and/or the downstream feeding port 32a and kneaded.

Figure 2:
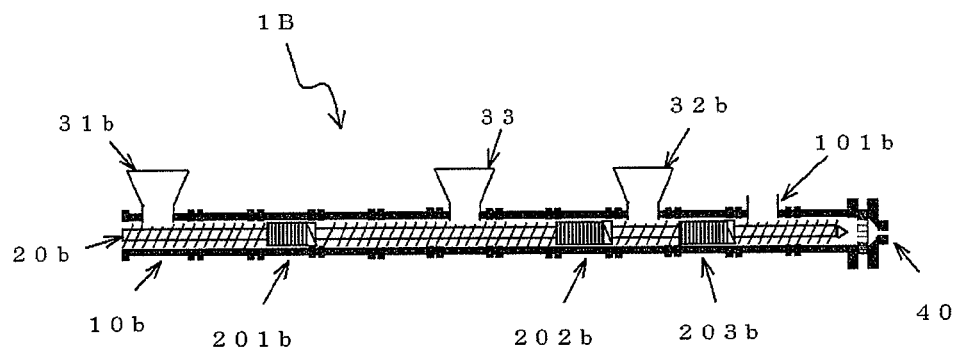
FIG. 2 is a diagram illustrating a second example of a kneading machine preferably used in the present invention.

In the present invention, the kneading machine may have a feeding port for feeding the component (D). FIG. 2 is a diagram illustrating a kneading machine 1B having a feeding port for elastomer 33 for feeding an elastomer. The cylinder 10b of this kneading machine 1B has the feeding port for elastomer 33 between the upstream feeding port 31b and the downstream feeding port 32b, and the screw 20b has a first kneading section 201b, a second kneading section 202b, and a third kneading section 203b. When using this kneading machine 1B, it is preferable that the component (D) be fed after feeding the component (A) and the component (B) as in the aforementioned method (2) so that the component (D) may be kneaded well with the first kneading section 201b and may be mixed well with the produced resin composition precursor.

The timing of feeding the component (D) is just after the completion of the first kneading step or at a time of from 1 second to 1800 seconds, preferably from 2 seconds to 600 seconds, and more preferably from 3 seconds to 300 seconds, after the start of kneading of the component (A) and the component (B) in the first kneading step. The kneading time of the resin composition precursor and the component (D) is from 1 second to 1800 seconds, preferably from 2 seconds to 600 seconds, and more preferably from 3 seconds to 300 seconds. If the kneading time is less than 1 second, the kneading amount, which is the product of a shear rate and a kneading time, becomes insufficient and there is a tendency that the dispersed particle diameter of the component (A) becomes large, so that mechanical strength lowers. If the kneading time exceeds 1800 seconds, there is a tendency that mechanical strength decreases or the appearance of a molded article deteriorates due to thermal deterioration.

Figure 3:
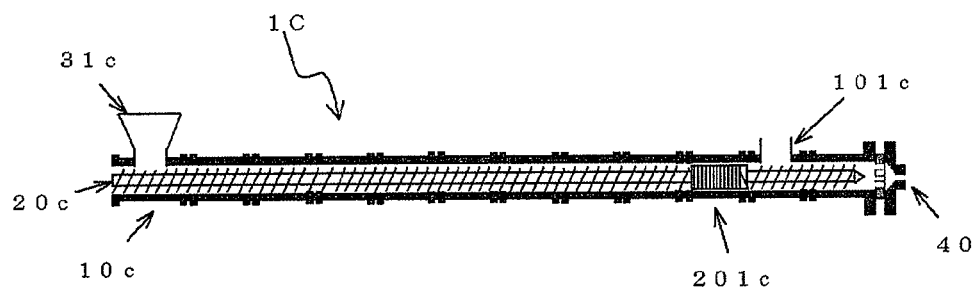
FIG. 3 is a diagram illustrating a third example of a kneading machine preferably used in the present invention.

In the present invention, the kneading machine may have a single feeding port instead of the upstream feeding port and the downstream feeding port mentioned above. The kneading machine 1C shown in FIG. 3 is a kneading machine which has a single feeding port 31c. When using the kneading machine 1C, it is preferable to perform kneading in the order in which the component (A), the component (B), and optionally the component (D) are fed and kneaded first (a first kneading step) and finally the component (C) is fed and kneaded (a second kneading step). Alternatively, it is preferable to perform kneading in the order in which the component (A) and the component (B) are fed and kneaded to produce a resin composition precursor, and then the component (D) is fed and kneaded (a first kneading step), and finally the component (C) is fed and kneaded (a second kneading step).

The cylinder preset temperature of the first kneading step and the second kneading step is preferably 50° C. to 300° C., and more preferably 100° C. to 250° C. The kneading time is preferably from 1 second to 1800 seconds, more preferably from 2 seconds to 600 seconds, and even more preferably from 3 seconds to 300 seconds.

As the kneading machines 1A to 1C, twin screw kneading machines are preferred because they are high in an ability to convey raw materials in a kneading machine fed with a screw wherein the raw materials have been fed through a hopper into the kneading machine, i.e., a treating ability of melt kneading, and from the viewpoint of kneading strength. Such kneading machines include, but are not limited to, TEX series manufactured by The Japan Steel Works, Ltd., TEM series manufactured by Toshiba Machine Co., Ltd., PCM series manufactured by IKEGAI Corp., ZSK series manufactured by Warner, and KTX series manufactured by Kobe Steel Ltd.

Examples of the method for molding the resin composition of the present invention include molding methods to be applied generally to thermoplastic resins, e.g., an injection molding method, an extrusion molding method, and a blow molding method. The resin composition of the present invention can be used widely in the automobile field, the household appliance field, the industrial field, and the like because it is excellent in tensile elongation at break, impact resistance, and gloss.

EXAMPLES

The present invention is described in detail below with reference to Examples. Evaluations of properties were performed by the following methods.

(1) Measurement of Molecular Weight Distribution

The molecular weight distribution of a macromolecular material was measured under the following conditions by gel permeation chromatography (GPC).
Instrument: 150 C ALC/GPC manufactured by Waters
Column: Shodex Packed Column A-80M (two columns) manufactured by Showa Denko K.K.
Temperature: 140° C.
Solvent: o-Dichlorobenzene
Eluant flow rate: 1.0 ml/min
Sample concentration: 1 mg/ml
Injection amount: 400 μL.
Molecular weight standard substance: Standard polystyrenes
Detector: Differential refractometer (2) Content of Monomer Units Derived from Glycidyl Methacrylate (Unit: % by Mass)

The content of monomer units derived from glycidyl methacrylate was determined by a method in which an infrared absorption spectrum of a press sheet of a macromolecular material is measured, the absorbance of a characteristic absorption of the obtained infrared absorption spectrum is corrected by the thickness of the sheet used for the measurement, and the content of monomer units derived from glycidyl methacrylate is determined by a calibration curve method on the basis of the obtained corrected absorbance. A peak of 910 cm$^{-1}$ was used as the characteristic absorption of glycidyl methacrylate.

(3) Differential Scanning Calorimetry (DSC)

The melting temperature and the amount of heat of fusion were measured under the following conditions by using a differential scanning calorimeter (DSC220C manufactured by Seiko Instruments & Electronics Ltd.; input compensation DSC). Indium was used as a standard substance for the measurement.

(i) A sample (about 5 mg) was increased in temperature from room temperature to 200° C. at a rate of 30° C./minute and after the completion of the temperature increase, it was held for 5 minutes.

(ii) Subsequently, the temperature was decreased from 200° C. to −50° C. at a rate of 10° C./minute, and after the completion of the temperature decrease, the temperature was maintained for 5 minutes.

(iii) Subsequently, the temperature was increased from −50° C. to 200° C. at a rate of 10° C./minute.

(4) IZOD Impact Strength (Unit: kJ/m$^2$)

The IZOD impact strength of a molded article was measured in accordance with the method prescribed in JIS K 7110 (1984). In the measurement was used a specimen with a thickness of 3.2 mm which was molded by injection molding and notched after the molding. The measurement was carried out at temperatures of 23° C. and −30° C.

(5) Tensile Elongation (Unit: %)

The tensile elongation of a molded article was measured in accordance with the method prescribed in ASTM D638. A 3.2 mm thick specimen molded by injection molding was used. The tensile speed was 50 mm/minute and the elongation of the gauge length (initial value=50 mm) at the time of breaking was evaluated. The measurement was carried out at 23° C.

(6) Measurement of Particle Diameter (Unit: μm)

A central portion of a molded article 127 mm in length, 12.7 mm in width, and 3.2 mm in thickness, obtained by injection molding was cut so that it could be observed from the direction perpendicular to the resin flow direction. Then a thin section was prepared with a microtome, stained with RuO$_4$, and observed with a transmission electron microscope (TEM). Thus, a morphology photograph was obtained. Observation can be done easily by coloring because polylactic acid becomes white since it is difficult to be stained with RuO$_4$ and other components are stained more easily than polylactic acid.

The obtained photograph was captured into and thresholded by an image analyzer, and thereby the dispersed particle diameter of unstained polylactic acid was determined.

Materials used in the Examples are as follows.

(A) Biodegradable Resin (Component (A))

a1: "TERRAMAC (registered trademark) TE-4000" produced by Unitika, Ltd. (Polylactic acid resin)

a2: "TERRAMAC (registered trademark) TE-2000C" produced by Unitika, Ltd. (Polylactic acid resin)

(B) Ethylene-Based Polymer Having an Epoxy Group (Component (B))

"Bondfast (registered trademark) E" produced by Sumitomo Chemical Co., Ltd. (Ethylene-glycidyl methacrylate copolymer, MFR (190° C.)=3 g/10 minutes, content of monomer units derived from glycidyl methacrylate=12% by mass)

(C) Polyolefin Resin (Component (C))

"Noblen (registered trademark) WPX5343" produced by Sumitomo Chemical Co., Ltd. (Polypropylene block copolymer, MFR (230° C.)=50 g/10 minutes)

(D) Elastomer (Component (D))

d1: "Excellene (registered trademark) FX CX5505" produced by Sumitomo Chemical Co., Ltd. (Ethylene-1-butene copolymer, content of monomer units derived from 1-butene=23% by mass, MFR (measured at 190° C.)=16 g/10 minutes, density (d)=880 kg/m$^3$, weight average molecular weight (Mw)/number average molecular weight (Mn) ratio=1.8, melting temperature=53° C., amount of heat of fusion=51 J/g)

d2: "Engage (registered trademark) EG8100" produced by The Dow Chemical Company (Ethylene-octene copolymer, MFR (measured at 190° C.)=1.0 g/10 minutes)

(E) Additives

As additives, 0.05 parts by mass of a light stabilizer (SANOL (registered trademark) 770, produced by Ciba Specialty Chemicals Corporation), 0.03 parts by mass of a UV absorber (Sumisorb (registered trademark), produced by Sumitomo Chemical Co., Ltd.), and 0.3 parts by mass of an antistatic agent (Electrostripper (registered trademark) TS-5, produced by Kao Corporation) were used for 100 parts by mass of a resin composition.

Examples 1 to 6 and Comparative Examples 1 to 3

Resin compositions according to the present invention were produced by the following method. Kneading was carried out at the mixing ratios and the kneading methods given in Table 1 by using a twin screw kneading extruder (TEM50A, manufactured by Machine Co., Ltd.) having a cylinder internal diameter of 50 mm. The cylinder temperature was set at 190° C., and pellets of a resin composition were obtained at an extrusion rate of 50 kg/hr and a screw rotation rate of 200 rpm. In Example 1, the resin temperature at the kneading machine outlet was 236° C.

Specimens for property evaluation were prepared under the following injection molding conditions. The pellets of the resin composition obtained above were subjected to injection molding by using a Sycap 110/50 injection molding machine manufactured by Sumitomo Heavy Industries, Ltd., at a molding temperature of 200° C., and a mold cooling temperature of 30° C., for an injection time of 15 seconds, and a cooling time of 30 seconds. The IZOD impact strength of the resulting injection molded article and the dispersed particle diameter of the polylactic acid were measured. The results are shown in Tables 1 and 2.

TABLE 1

|  | Example 1 | Example 2 | Comparative Example 1 | Example 3 | Comparative Example 2 |
|---|---|---|---|---|---|
| Kneading conditions | | | | | |
| First kneading step 1st Feed | | | | | |
| Component (A): a1 [% by mass] | 30 | 30 | 30 | 30 | 30 |
| Component (B) [% by mass] | 5 | 5 | 5 | 5 | 5 |
| Component (C) [% by mass] | 0 | 0 | 53 | 10 | 47 |
| Component (D): d1 [% by mass] | 12 | 12 | 12 | 18 | 18 |
| Additives [phr] | 0 | 0 | 0.38 | 0.38 | 0.38 |
| Second kneading step 2nd Feed | | | | | |
| Component (C) [% by mass] | 37 | 20 | 0 | 37 | 0 |
| Additives [phr] | 0.38 | 0.38 | 0 | 0 | 0 |
| Second kneading step 3rd Feed | | | | | |
| Component (C) [% by mass] | 0 | 33 | 0 | 0 | 0 |
| Physical properties | | | | | |
| IZOD impact strength at 23° C. [kJ/m$^2$] | 22 | 20 | 17 | 35 | 24 |
| IZOD impact strength at −30° C. [kJ/m$^2$] | 6.0 | 6.0 | 3.1 | 7.1 | 3.2 |
| Tensile elongation [%] | 104 | 74 | 35 | Not measured | Not measured |
| Particle diameter [μm] | 0.35 | 0.46 | 0.53 | 0.25 | 0.38 |

TABLE 2

|  | Example 4 | Example 5 | Example 6 | Comparative Example 3 |
|---|---|---|---|---|
| Kneading conditions | | | | |
| First kneading step 1st Feed | | | | |
| Component (A): a2 [% by mass] | 30 | 30 | 30 | 30 |
| Component (B) [% by mass] | 4 | 4 | 4 | 4 |
| Component (C) [% by mass] | 0 | 0 | 0 | 56 |
| Component (D): d2 [% by mass] | 10 | 10 | 0 | 10 |
| Additives [phr] | 0 | 0 | 0 | 0 |
| Second kneading step 2nd Feed | | | | |
| Component (C) [% by mass] | 15 | 56 | 56 | 0 |
| Component (D): d2 [% by mass] | 0 | 0 | 10 | 0 |
| Second kneading step 3rd Feed | | | | |
| Component (C) [% by mass] | 41 | 0 | 0 | 0 |
| Physical properties | | | | |
| IZOD impact strength at 23° C. [kJ/m$^2$] | 9.4 | 8.9 | 7.3 | 5.2 |
| IZOD impact strength at −30° C. [kJ/m$^2$] | 4.0 | 3.9 | 2.1 | 2.0 |
| Tensile elongation [%] | 35 | 36 | 28 | 10 |
| Particle diameter [μm] | 0.7 | 0.8 | 2.2 | 2.9 |

INDUSTRIAL APPLICABILITY

According to the present invention, it becomes possible to provide a resin composition which is good in dispersibility of a biodegradable resin. As a result of this, it becomes possible to increase the impact strength of a molded article to be obtained.

The invention claimed is:

1. A method for producing a resin composition containing (A) a biodegradable resin and (C) a polyolefin resin, wherein the method comprises:
    a first kneading step of kneading the biodegradable resin (A) and (B) a compound that is reactive with the biodegradable resin (A) to produce a resin composition precursor, and
    a second kneading step of kneading the resin composition precursor and the polyolefin resin (C), wherein in the first kneading step, (D) an elastomer is further added and kneaded prior to the formation of the resin composition precursor.

2. The method for producing a resin composition according to claim 1, wherein the method further comprises a step of kneading the resin composition precursor and an elastomer (D) between the first kneading step and the second kneading step.

3. The method for producing a resin composition according to claim 1, wherein the biodegradable resin (A) contains a resin produced from a plant-derived raw material.

4. The method for producing a resin composition according to claim 3, wherein the plant-derived raw material contains a polylactic acid-based resin.

5. The method for producing a resin composition according to claim 1, wherein the compound (B) contains at least one compound selected from the group consisting of polymers of a compound having an epoxy group and polymers of a compound having an unsaturated carboxylic acid.

6. The method for producing a resin composition according to claim 1, wherein the elastomer (D) contains an ethylene-based elastomer.

7. A molded article obtained by molding a resin composition obtained by the method according to claim 1.

* * * * *